United States Patent
Li

(10) Patent No.: US 11,458,535 B2
(45) Date of Patent: Oct. 4, 2022

(54) TRANSFER EQUIPMENT, ALUMINUM LIQUID TRANSFER SYSTEM AND ALUMINUM LIQUID TRANSFER METHOD

(71) Applicant: CITIC Dicastal Co., LTD, Qinhuangdao (CN)

(72) Inventor: Naili Li, Qinhuangdao (CN)

(73) Assignee: CITIC Dicastal Co., LTD, Qinhuangdao (CN)

( * ) Notice: Subject to any disclaimer, the term of this patent is extended or adjusted under 35 U.S.C. 154(b) by 439 days.

(21) Appl. No.: 16/746,943

(22) Filed: Jan. 19, 2020

(65) Prior Publication Data
US 2021/0121948 A1   Apr. 29, 2021

(30) Foreign Application Priority Data
Oct. 23, 2019   (CN) .......................... 201911011586.0

(51) Int. Cl.
*B22D 41/12*   (2006.01)
*B66C 17/06*   (2006.01)

(52) U.S. Cl.
CPC .............. *B22D 41/12* (2013.01); *B66C 17/06* (2013.01)

(58) Field of Classification Search
CPC ................................ B22D 41/12; B66C 17/06
See application file for complete search history.

(56) References Cited

U.S. PATENT DOCUMENTS

2009/0236067 A1*  9/2009  Rees ................... B22D 11/0697
                                                          164/452

FOREIGN PATENT DOCUMENTS

| CN | 203972837 U | * | 12/2014 | |
| CN | 104308135 A | * | 1/2015 | ............. B22D 35/04 |
| CN | 109158584 A | * | 1/2019 | ............. B22D 41/12 |

* cited by examiner

*Primary Examiner* — Stephen P Avila
(74) *Attorney, Agent, or Firm* — Yong Chen

(57) ABSTRACT

The disclosure relates to a transfer equipment, an aluminum liquid transfer system and an aluminum liquid transfer method. An exemplary transfer equipment comprises a rail platform; a pushing device; a rotating device; wherein the two ends of the rail platforms are adapted to interface with a rail-type transfer trolley running on the casting line, so that the molten liquid container can be transferred from a rail-type transfer trolley on one casting line to one end of the rail platform, and from the other end of the rail platform to a rail-type transfer trolley on the adjacent other casting line, and the turnplate of the rotating device is adapted to interface with the transfer rail on the rail platform, so that the molten liquid container can be transferred from the transfer rail to the turnplate, and to the transfer rail after the orientation has been changed by rotation on the turnplate.

12 Claims, 3 Drawing Sheets

TRANSFER EQUIPMENT, ALUMINUM LIQUID TRANSFER SYSTEM AND ALUMINUM LIQUID TRANSFER METHOD

CROSS-REFERENCE TO RELATED APPLICATIONS

The present application claims the priority of Chinese patent application No. 201911011586.0, filed on Oct. 23, 2019, which is hereby incorporated by reference in its entirety.

TECHNICAL FIELD

The disclosure relates to transfer equipment, an aluminum liquid transfer system and an aluminum liquid transfer method, and is particularly applied to the technical field of differential pressure die casting production equipment.

BACKGROUND

In the differential pressure casting production process of the aluminum alloy parts, aluminum liquid produced by the melting furnace is injected into the crucible furnace, the crucible furnace full of the aluminum liquid is conveyed to the inside of the die-casting machine by the rail-type transfer trolley, the crucible furnace at the low liquid level inside the die-casting machine is conveyed to the melting furnace by the rail-type transfer trolley to continue to be injected with the aluminum liquid, and the process is circulated in sequence. The rail-type transfer trolley is provided with a push-pull device which can push or pull the crucible furnace into or out of the position below the aluminum liquid outlet of the melting furnace, or into or out of the interior of the die-casting machine. One side of the crucible furnace is provided with a heating power supply interface device (this side faces the die-casting machine), and the other side is welded with a push-pull hook. In the differential pressure casting production, usually one melting furnace and a plurality of die-casting machines have a layout of a straight line shape, equipped with a rail-type transfer trolley to form a casting line, and two adjacent casting lines are usually have a back-to-back layout of the die-casting machines (to save space). When the number of the started die-casting machines in the two adjacent casting lines is less than a certain amount for a long time, one melting furnace will be unused for saving the production cost, and in this case, a forklift is needed to cooperate to transfer the crucible furnace, so that the crucible furnace full of the aluminum liquid is placed on the transfer trolley of the casting line of the unused melting furnace, and then the crucible furnace at the low liquid level on the casting line of the unused melting furnace is placed below the aluminum liquid outlet of the started melting furnace. Using forklift to transfer the crucible furnace has potential safety hazard, inconvenient operation and low working efficiency.

SUMMARY

The object of the present application is to provide transfer equipment to overcome the above-mentioned drawbacks in the prior art. Specifically, the application intends to provide a rail-type rotary transfer equipment, wherein a crucible furnace is pushed onto the equipment by a rail-type transfer trolley, then the crucible furnace is moved to a rotating device at the center by operating the equipment, and after the crucible furnace is rotated and changed in direction (for example, after the crucible furnace is rotated by 180 degrees), the crucible furnace continues to be moved, and the rail-type transfer trolley of the adjacent casting line can be used for conveying the crucible furnace into a die-casting machine for use or conveying the crucible furnace to a melting furnace to be injected with aluminum liquid. This equipment is simple to operate, and is safe and reliable, so that the work efficiency is improved. On the basis of this equipment, an aluminum transfer system and method are provided.

In order to achieve the above object, the present disclosure provides the following technical solutions.

In the first aspect, transfer equipment for transferring casting molten liquid between adjacently arranged casting lines is provided, wherein the transfer equipment comprises: a rail platform, a transfer rail being mounted on the platform, wherein a molten liquid container can move between the two ends of the rail platform and along the transfer rail;

a pushing device, the device being capable of pushing the molten liquid container to move on the rail platform and along the transfer rail;

a rotating device, the device being mounted at the central position between the two ends of the rail platform and has a turnplate for receiving the molten liquid container and driving the molten liquid container to rotate;

wherein the two ends of the rail platforms are adapted to interface with a rail-type transfer trolley running on the casting line, so that the molten liquid container can be transferred from a rail-type transfer trolley on one casting line to one end of the rail platform, and from the other end of the rail platform to a rail-type transfer trolley on the adjacent other casting line, and the turnplate of the rotating device is adapted to interface with the transfer rail on the rail platform, so that the molten liquid container can be transferred from the transfer rail to the turnplate, and to the transfer rail after the orientation has been changed by rotation on the turnplate.

Preferably, the transfer equipment comprises support gantries and a main beam, the support gantries are respectively mounted at the two ends of the rail platform, the two ends of the main beam are mounted at the middle positions of the tops of the support gantries, and the pushing device is installed on the main beam.

It can be set, the rail platform is of equal height with the rail-type transfer trolley on the casting line, so that the rail platform interface with the rail-type trolleye when transfer operations are performed.

According to a specific design form, the rail platform and the rotating device are fixed on the ground, the turnplate of the rotating device can rotate by 180 degrees to achieve a 180 degrees orientation change of the molten liquid container, and the rail on the turnplate and the transfer rail on the rail platform are aligned with each other and butted against each other when the turnplate is at the 0 degree orientation and 180 degree orientation. The design is especially suitable for the situation of back-to-back layout of each die-casting machine on two adjacent casting lines.

Advantageously, the support gantries are made of profile steel through welding, and the widths and the heights of the inner portions of the support gantries can guarantee that the crucible furnace can pass through smoothly.

According to a specific design form, the pushing device comprises a moving plate and a lifting plate, the moving plate is movable on the main beam, the lifting plate is liftable relative to the moving plate, and when the lifting plate is lowered to a low position, a push rod fixed on the lifting plate is operatively connected to the molten liquid container, so that the molten liquid container is pushed to move by the pushing device.

According to a further specific design form, the pushing device comprises a guiding rail and a rack which are fixed on the main beam, the moving plate is fixed on the bottom plate of the C-type moving frame, the C-type moving frame is provided with a linear bearing and a motor reducer, a drive gear is mounted on the drive shaft of the motor reducer, the linear bearing is assembled on the guiding rail, the drive gear is meshed with the rack, and the rotation of the motor reducer enables the C-type moving frame and the moving plate to move on the main beam.

According to a further specific design form, two lifting cylinders are fixed at the two ends of the moving plate, cylinder rods of the lifting cylinders are fixed on the lifting plate, four guiding rods are fixed above the lifting plate, the four guiding rods respectively penetrate through guiding holes at four corners of the moving plate, four push rods are fixed at four corners below the lifting plate, when the lifting cylinders contract, the lifting plate and the push rods fixed on the lifting plate rise to a high position, and when the lifting cylinders extend, the lifting plate and the push rods fixed on the lifting plate are lowered to a low position, when the push rods are at the low position, the pushing device can push the molten liquid container to move, and when the push rod is at the high position, the pushing device can move automatically, the molten liquid container can move on the transfer equipment, and the molten liquid container does not interfere with the pushing device.

Advantageously, when the push rods are at the high position, the bottom surfaces of the push rods are at least 30 mm higher than the top surface of the molten liquid container, and when the push rods are at a low position, the bottom surfaces of the push rods are at least 100 mm lower than the top surface of the molten liquid container.

With regard to the rotating device, according to a specific design form, the rotating device comprises a rotating disc forming the turnplate, a rotatory motor reducer, a motor bracket, a rotary bearing and a mounting base, wherein a molten liquid container running rail is provided or machined on the rotating disc, the rotating disc is welded on the disc bracket, the bottom of the disc bracket is mounted on the rotary bearing, the rotary bearing is mounted on the mounting base, and the mounting base is fixed on the ground; the bottom surface of the rotating disc is welded with a ring gear, the rotary motor reducer is mounted on the motor bracket, the motor bracket is fixed on the mounting base, a drive gear is mounted on the drive shaft of the rotary motor reducer, the drive gear is meshed with the ring gear, and when the rotary motor reducer rotates, the rotating disc is driven to rotate.

Further specifically, four bearing supports are evenly fixed on the mounting base, four universal ball bearings are mounted on the bearing supports, and the universal ball bearings are supported on the bottom surface of the rotating disc and are in contact with the bottom surface of the rotating disc, so that the bearing capacity of the rotating disc can be increased.

According to the application, the rail-type rotary transfer equipment can be achieved, wherein comprises support gantries, a rail platform, a main beam, a pushing device and a rotating device. The two support gantries are respectively mounted at the two ends of the rail platform, the rail platform is of equal height with the rail-type transfer trolley, a crucible furnace transfer rail is mounted on the rail platform, a rotating device is mounted in the center of the rail platform, the rail platform and the rotating device are fixed on the ground, the turnplate of the rotating device can rotate by 180 degrees, when the turnplate is at 0 degree and 180 degrees, the rail on the turnplate is aligned with the rail on the rail platform, the two ends of the main beam are mounted at the middle positions of the tops of the support gantries, the pushing device is mounted on the main beam, and the pushing device can push the crucible furnace to move on the rail platform; the crucible furnace is pushed onto the rail platform of the equipment by the use of the rail-type transfer trolley, the equipment is operated, the pushing device pushes the crucible furnace to move onto the rotating device, after the rotating device rotates by degrees, the pushing device continues to push the crucible furnace to move to the other end of the rail platform, and the crucible furnace can be used on the adjacent casting line through pulling the crucible furnace onto the transfer trolley by the use of the rail-type transfer trolley of the adjacent casting line.

In some embodiments, the support gantries are made of profile steel through welding, and the widths and the heights of the inner portions of the support gantries can guarantee that the crucible furnace can pass through smoothly.

In some embodiments, the pushing device comprises a guiding rail, push rods, a lifting plate, guiding rods, lifting cylinders, a C-type moving frame, a moving plate, a motor reducer, a gear, a linear bearing and a rack, wherein the guiding rail and the rack are fixed on the main beam, the linear bearing and the motor reducer are assembled on the C-type moving frame, the gear is mounted on the drive shaft of the motor reducer, the linear bearing is assembled on the guiding rail, the gear is meshed with the rack, and the C-type moving frame can move on the main beam if the motor reducer rotates; the moving plate is fixed on the bottom plate of the C-type moving frame, two lifting cylinders are fixed at the two ends of the moving plate, cylinder rods thereof are fixed on the lifting plate, four guiding rods are fixed above the lifting plate and respectively penetrate through guiding holes at four corners of the moving plate, four push rods are fixed at four corners below the lifting plate, when the lifting cylinders contract, the lifting plate and the push rods fixed on the lifting plate rise to a high position, when the lifting cylinders extend, the lifting plate and the push rods fixed on the lifting plate are lowered to a low position, when the push rods are at the high position, the bottom surfaces of the push rods are at least 30 mm higher than the top surface of the crucible furnace, and when the push rods are at a low position, the bottom surfaces of the push rods are at least 100 mm lower than the top surface of the crucible furnace, so that when the push rods are at the low position, the pushing device can push the crucible furnace to move, and when the push rods are at the high position, the pushing device can move automatically without interfering with the crucible furnace, and similarly, when the push rods are at the high position, the crucible furnace can move on the rail-type rotary transfer equipment without interfering with the pushing device.

In some embodiments, the rotating device comprises a rotating disc, a disc bracket, a ring gear, a rotatory motor reducer, a motor bracket, a rotary bearing, universal ball bearings, bearing supports and a mounting base, wherein a crucible furnace running rail is machined on the rotating disc, the rotating disc is welded on the disc bracket, the bottom of the disc bracket is mounted on the rotary bearing, the rotary bearing is mounted on the mounting base, and the mounting base is fixed on the ground; the ring gear is welded on the bottom surface of the rotating disc, the rotary motor reducer is mounted on the motor bracket, the motor bracket is fixed on the mounting base, a drive gear is mounted on the drive shaft of the rotary motor reducer, the drive gear is meshed with the ring gear and when the rotary motor reducer rotates, the rotating disc is driven to rotate; four universal ball bearings are mounted on the bearing supports, the four bearing supports are evenly fixed on the mounting base, and the universal ball bearings are supported on the bottom surface of the rotating disc and are in contact with the bottom surface of the rotating disc, so that the bearing capacity of the rotating disc is increased.

In the second aspect, the present application provides an aluminum liquid transfer system, the rail platform of the transfer equipment extends between the adjacently arranged casting lines, wherein aluminum liquid is used as casting molten liquid, the crucible furnace constitutes the molten liquid container, and the crucible furnace supplies aluminum liquid to corresponding die-casting machine with matched orientation.

In the third aspect, the present application provides an aluminum liquid transfer method, aluminum liquid is transferred by us of the aluminum liquid transfer system described above, and the method comprises the following steps:

step 1st: the rail-type transfer trolley runs, along the rail, to the position below the aluminum liquid outlet of the melting furnace, the crucible furnace at the low liquid level is pushed to the position below the aluminum liquid outlet of the melting furnace to start to be injected with aluminum liquid, and after the injection is finished, the rail-type transfer trolley pulls the crucible furnace back to the rail-type transfer trolley;

step 2nd: the rail-type transfer trolley loaded with the aluminum liquid runs, along the rail, to the right ahead of the rail-type rotary transfer equipment, and the crucible furnace is pushed onto the rail-type rotary transfer equipment;

step 3rd: the rail-type rotary transfer equipment moves the crucible furnace onto the rotating device in the center of the equipment, and after the crucible furnace rotates by 180 degrees, the crucible furnace continues to be moved to the other end of the rail-type rotary transfer equipment;

step 4th: the rail-type transfer trolley of the adjacent casting line runs, along the rail, to the dead astern of the rail-type rotary transfer equipment, the crucible furnace is pulled into the rail-type transfer trolley, and the rail-type transfer trolley runs, along the rail, to the right ahead of the die-casting machine needing to use the aluminum liquid;

step 5th: the rail-type transfer trolley pushes the crucible furnace into the interior of the die-casting machine.

BRIEF DESCRIPTION OF THE DRAWINGS

In order to more clearly explain the technical solutions in the embodiments of the present application, the drawings that needs to be used in the description of the embodiments are briefly introduced below, and it is obvious that the drawings in the following description are some embodiments of the present application, and those skilled in the art can also obtain other drawings according to these drawings without creative work.

Figure 1:
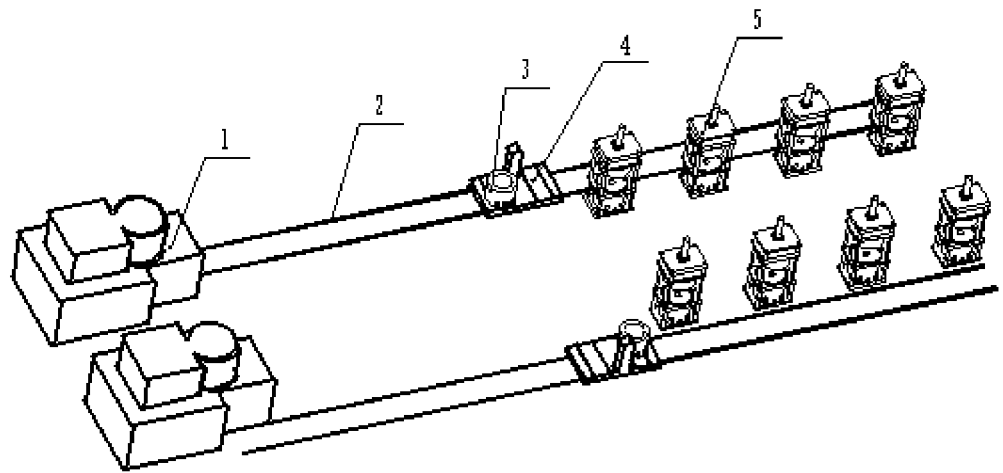
FIG. 1 is a schematic view of the layout of adjacent casting lines of the present disclosure.

Wherein: 1—melting furnace, 2—rail, 3—crucible furnace, 4—rail-type transfer trolley, 5—die-casting machine, 6—rail-type rotary transfer equipment, 61—support gantry, 62—rail platform, 63—main beam, 64—pushing device, 65—rotating device, 6401—guiding rail, 6402—push rod, 6403—lifting plate, 6405—lifting cylinder, 6406—C-type moving frame, 6407—moving plate, 6408—motor reducer, 6409—gear, 6410—linear bearing, 6411—rack, 6501—rotating disc, 6502—disc bracket, 6503—ring gear, 6504—rotatory motor reducer, 6505—motor bracket, 6506—pivotal bearing, 6507—universal ball bearing, 6508—bearing support and 6509—mounting base.

DETAILED DESCRIPTION

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

The present application provides transfer equipment for transfer casting molten liquid between adjacently arranged casting lines, which is characterized in that the transfer equipment includes: a rail platform 62, on which a transfer rail is mounted, wherein a molten liquid container can move between the two ends of the rail platform along the transfer rail; a pushing device 64, which is capable of pushing the molten liquid container to move on the rail platform and along the transfer rail; a rotating device 65, which is mounted at the central position between the two ends of the rail platform 62, and has a turnplate for receiving the molten liquid container and driving the molten liquid container to rotate; wherein the two ends of the rail platforms 62 are adapted to interface with a rail-type transfer trolley running on the casting line, so that the molten liquid container can be transferred from a rail-type transfer trolley on one casting line to one end of the rail platform, and from the other end of the rail platform to a rail-type transfer trolley on the adjacent other casting line, and the turnplate of the rotating device 65 is adapted to interface with the transfer rail on the rail platform, so that the molten liquid container can be transferred from the transfer rail to the turnplate, and to the transfer rail after the orientation has been changed by rotation on the turnplate.

Embodiment 1

Embodiment 1 of the present disclosure will be described below with reference to FIGS. 3 to 6: a rail-type rotary transfer equipment, which comprises support gantries 61, a rail platform 62, a main beam 63, a pushing device 64 and a rotating device 65. The two support gantries 61 are respectively mounted at the two ends of the rail platform 62, the rail platform 62 is of equal height with the rail-type transfer trolley, a crucible furnace transfer rail is mounted on the rail platform 62, a rotating device 65 is mounted in the center of the rail platform 62, the rail platform 62 and the rotating device 65 are fixed on the ground, the turnplate of the rotating device 65 can rotate by 180 degrees, when the turnplate is at 0 degree and 180 degrees, the rail on the turnplate is aligned with the rail on the rail platform 62, the two ends of the main beam 63 are mounted at the middle positions of the tops of the support gantries 61, the pushing device 64 is mounted on the main beam 63, and the pushing device 64 can push the crucible furnace to move on the rail platform 62; the crucible furnace is pushed onto the rail platform 62 of the equipment by the use of the rail-type transfer trolley, the equipment is operated, the pushing device 64 pushes the crucible furnace to move onto the rotating device 65, after the rotating device 65 rotates by 180 degrees, the pushing device 64 continues to push the crucible furnace to move to the other end of the rail platform 62, and the crucible furnace can be used on the adjacent casting line through pulling the crucible furnace onto the transfer trolley by the use of the rail-type transfer trolley of the adjacent casting line.

The support gantries 61 are made of profile steel through welding, and the widths and the heights of the inner portions of the support gantries 61 can guarantee that the crucible furnace can pass through smoothly.

The pushing device 64 comprises a guiding rail 6401, push rods 6402, a lifting plate 6403, guiding rods 6404, lifting cylinders 6405, a C-type moving frame 6406, a moving plate 6407, a motor reducer 6408, a gear 6409, a linear bearing 6410 and a rack 6411, wherein the guiding rail 6401 and the rack 6411 are fixed on the main beam 63, the linear bearing 6410 and the motor reducer 6408 are assembled on the C-type moving frame 6406, the gear 6409 is mounted on the drive shaft of the motor reducer 6408, the linear bearing 6410 is assembled on the guiding rail 6401, the gear 6409 is meshed with the rack 6411, and the C-type moving frame 6406 can move on the main beam 63 if the motor reducer 6408 rotates; the moving plate 6407 is fixed on the bottom plate of the C-type moving frame 6406, two lifting cylinders 6405 are fixed at the two ends of the moving plate 6407, cylinder rods thereof are fixed on the lifting plate 6403, four guiding rods 6404 are fixed above the lifting plate 6403 and respectively penetrate through guiding holes at four corners of the moving plate 6407, four push rods 6402 are fixed at four corners below the lifting plate 6403, when the lifting cylinders 6405 contract, the lifting plate 6403 and the push rods 6402 fixed on the lifting plate 6403 rise to a high position, when the lifting cylinders 6405 extend, the lifting plate 6403 and the push rods 6402 fixed on the lifting plate 6403 are lowered to a low position, when the push rods 6402 are at the high position, the bottom surfaces of the push rods 6402 are at least 30 mm higher than the top surface of the crucible furnace, and when the push rods 6402 are at a low position, the bottom surfaces of the push rods 6402 are at least 100 mm lower than the top surface of the crucible furnace, so that when the push rods 6402 are at the low position, the pushing device 64 can push the crucible furnace to move, and when the push rods 6402 are at the high position, the pushing device 64 can move automatically without interfering with the crucible furnace, and similarly, when the push rods 6402 are at the high position, the crucible furnace can move on the rail-type rotary transfer equipment 6 without interfering with the pushing device 64.

The rotating device 65 comprises a rotating disc 6501, a disc bracket 6502, a ring gear 6503, a rotatory motor reducer 6504, a motor bracket 6505, a rotary bearing 6506, universal ball bearings 6507, bearing supports 6508 and a mounting base 6509, wherein a crucible furnace running rail is machined on the rotating disc 6501, the rotating disc 6501 is welded on the disc bracket 6502, the bottom of the disc bracket 6502 is mounted on the rotary bearing 6506, the rotary bearing 6506 is mounted on the mounting base 6509, and the mounting base 6509 is fixed on the ground; the ring gear 6503 is welded on the bottom surface of the rotating disc 6501, the rotatory motor reducer 6504 is mounted on the motor bracket 6505, the motor bracket 6505 is fixed on the mounting base 6509, a drive gear is mounted on the drive shaft of the rotary motor reducer 6504, the drive gear is meshed with the ring gear 6503, and when the rotary motor reducer 6504 rotates, the rotating disc 6501 is driven to rotate; four universal ball bearings 6507 are mounted on the bearing supports 6508, the four bearing supports 6508 are evenly fixed on the mounting base 6509, and the universal ball bearings 6507 are supported on the bottom surface of the rotating disc 6501 and are in contact with the bottom surface of the rotating disc 6501, so that the bearing capacity of the rotating disc 6501 is increased.

Embodiment 2

Figure 2:
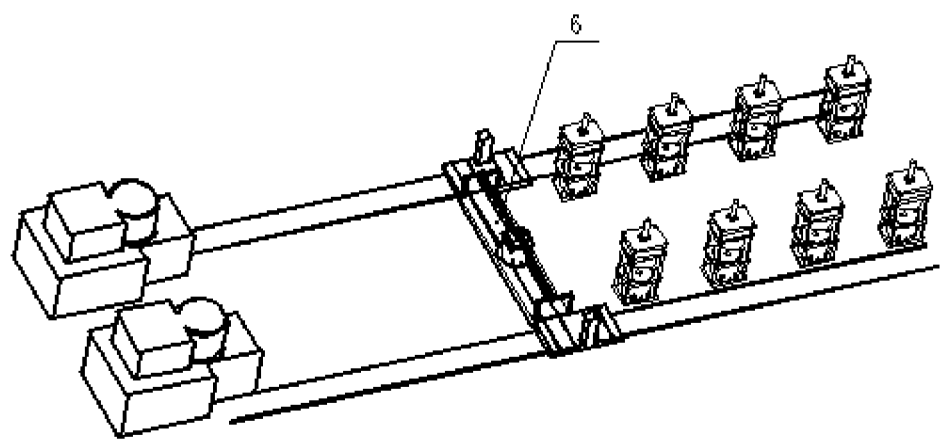
FIG. 2 is a schematic view of an aluminum liquid transfer system of the present disclosure.
Figure 3:
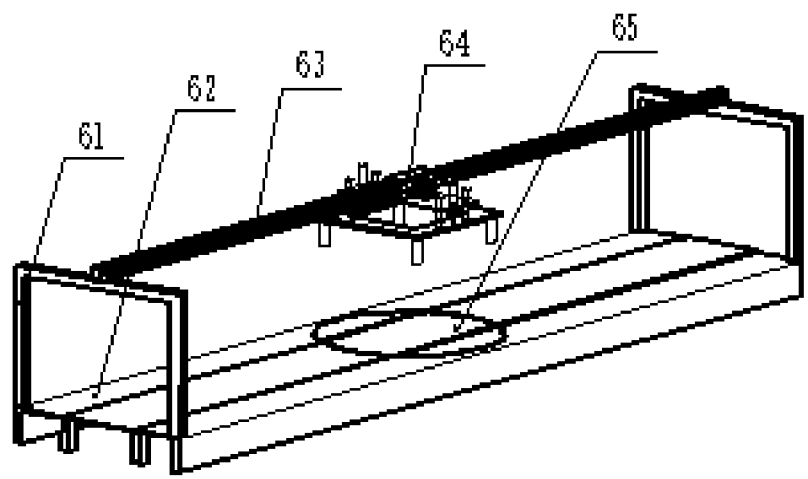
FIG. 3 is a structural view of a rail-type rotary transfer equipment of the present disclosure.
Figure 4:
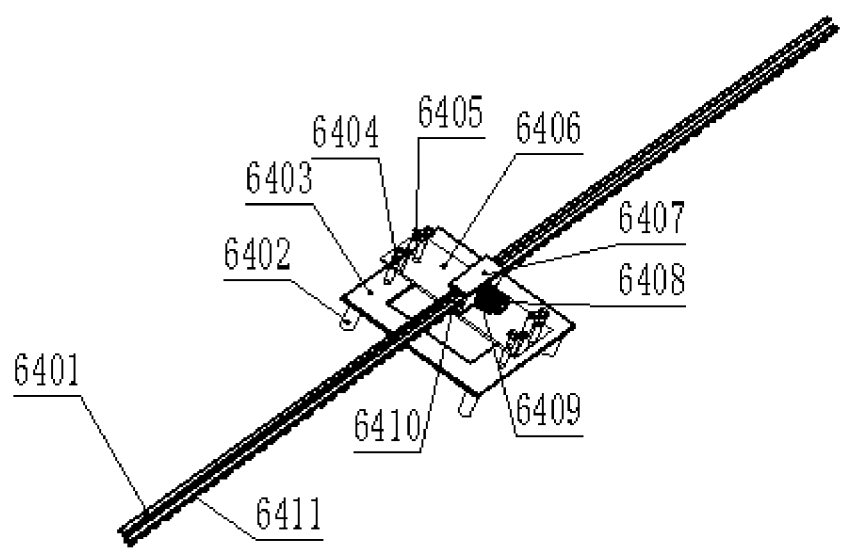
FIG. 4 is a structural view of the pushing device of the rail-type rotary transfer equipment of the present disclosure.
Figure 5:
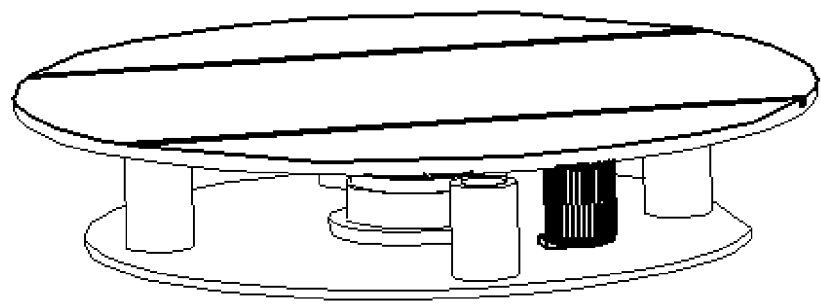
FIG. 5 is a schematic view of the rotating device of the rail-type rotary transfer equipment of the present disclosure.
Figure 6:
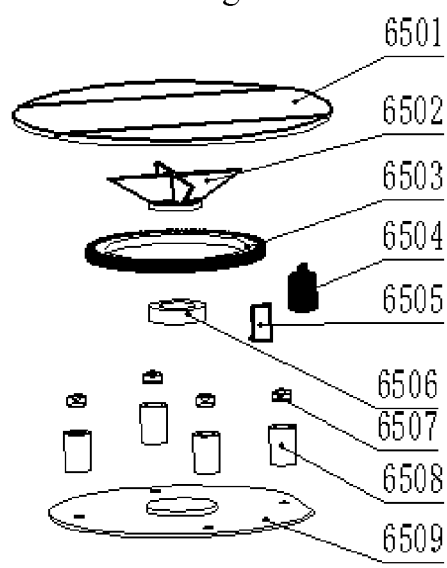
FIG. 6 is an exploded structural view of the rotating device of the rail-type rotary transfer equipment of the present disclosure.
Figure 7:
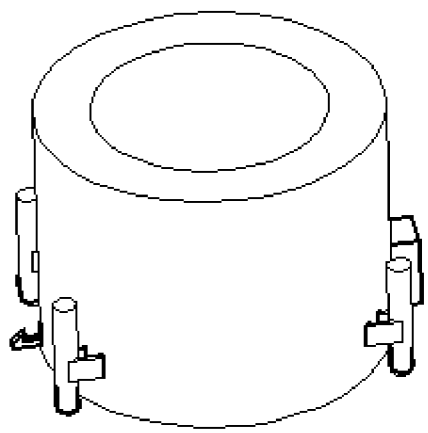
FIG. 7 is a schematic view of a crucible furnace.

As shown in FIG. 2, embodiment 2 provides an aluminum liquid transfer system, which includes a melting furnace 1, a rail 2, a crucible furnace 3, a rail-type transfer trolley 4, and a die-casting machine 5, and further includes a rail-type rotary transfer equipment 6 described in embodiment 1.

As shown in FIG. 2, the aluminum liquid transfer method of the aluminum liquid transfer system in embodiment 2 includes the following steps:

step 1st: the rail-type transfer trolley 4 runs, along the rail 2, to the position below the aluminum liquid outlet of the melting furnace 1, the crucible furnace at the low liquid level is pushed to the position below the aluminum liquid outlet of the melting furnace 1 to start to be injected with aluminum liquid, and after the injection is finished, the rail-type transfer trolley 4 pulls the crucible furnace back to the rail-type transfer trolley 4;

step 2nd: the rail-type transfer trolley 4 loaded with the aluminum liquid runs, along the rail 2, to the right ahead of the rail-type rotary transfer equipment 6, and the crucible furnace is pushed onto the rail-type rotary transfer equipment 6;

step 3rd: the rail-type rotary transfer equipment 6 moves the crucible furnace onto the rotating device 65 in the center of the equipment, and after the crucible furnace rotates by 180 degrees, the crucible furnace continues to be moved to the other end of the rail-type rotary transfer equipment 6;

step 4th: the rail-type transfer trolley 4 of the adjacent casting line runs, along the rail 2, to the dead astern of the rail-type rotary transfer equipment 6, the crucible furnace is pulled into the rail-type transfer trolley 4, and the rail-type transfer trolley 4 runs, along the rail 2, to the right ahead of the die-casting machine 5 needing to use the aluminum liquid;

step 5th: the rail-type transfer trolley 4 pushes the crucible furnace into the interior of the die-casting machine 5.

It can be seen that the present disclosure provides a rail-type rotary transfer equipment, an aluminum liquid transfer system and an aluminum liquid transfer method, wherein the crucible furnace is pushed onto the equipment by the use of the rail-type transfer trolley, the equipment is operated to move the crucible furnace onto a rotating device at the center, the crucible furnace continues to be moved after rotation by 180 degrees, and by the use of the rail-type transfer trolley of the adjacent casting line, the crucible furnace can be conveyed into a die-casting machine for use or conveyed to a melting furnace to be injected with aluminum liquid. This equipment is simple to operate, and is safe and reliable, so that the work efficiency is improved.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

What is claimed is:

1. A transfer equipment for transferring casting molten liquid between adjacently arranged casting lines, wherein the transfer equipment comprises:
   a rail platform, a transfer rail being mounted on the platform, wherein a molten liquid container can move between the two ends of the rail platform and along the transfer rail;
   a pushing device, the device being capable of pushing the molten liquid container to move on the rail platform and along the transfer rail; and
   a rotating device, the device being mounted at the central position between the two ends of the rail platform and has a turnplate for receiving the molten liquid container and driving the molten liquid container to rotate;
   wherein the two ends of the rail platforms are adapted to interface with a rail-type transfer trolley running on the casting line, so that the molten liquid container can be transferred from a rail-type transfer trolley on one casting line to one end of the rail platform, and from the other end of the rail platform to a rail-type transfer trolley on the adjacent other casting line, and the turnplate of the rotating device is adapted to interface with the transfer rail on the rail platform, so that the molten liquid container can be transferred from the transfer rail to the turnplate, and to the transfer rail after the orientation has been changed by rotation on the turnplate.

2. The transfer equipment according to claim 1, wherein the transfer equipment comprises support gantries and a main beam, the support gantries are respectively mounted at the two ends of the rail platform, the two ends of the main beam are mounted at the middle positions of the tops of the support gantries, and the pushing device is installed on the main beam.

3. The transfer equipment according to claim 2, wherein the support gantries are made of profile steel through welding, and the widths and the heights of the inner portions of the support gantries can guarantee that the crucible furnace can pass through smoothly.

4. The transfer equipment according to claim 2, wherein the pushing device comprises a moving plate and a lifting plate, the moving plate is movable on the main beam, the lifting plate is liftable relative to the moving plate, and when the lifting plate is lowered to a low position, a push rod fixed on the lifting plate is operatively connected to the molten liquid container, so that the molten liquid container is pushed to move by the pushing device.

5. The transfer equipment according to claim 4, wherein the pushing device comprises a guiding rail and a rack which are fixed on the main beam, the moving plate is fixed on the bottom plate of the C-type moving frame, the C-type moving frame is provided with a linear bearing and a motor reducer, a drive gear is mounted on the drive shaft of the motor reducer, the linear bearing is assembled on the guiding rail, the drive gear is meshed with the rack, and the rotation of the motor reducer enables the C-type moving frame and the moving plate to move on the main beam.

6. The transfer equipment according to claim 4, wherein two lifting cylinders are fixed at the two ends of the moving plate, cylinder rods of the lifting cylinders are fixed on the lifting plate, four guiding rods are fixed above the lifting plate, the four guiding rods respectively penetrate through guiding holes at four corners of the moving plate, four push rods are fixed at four corners below the lifting plate, when the lifting cylinders contract, the lifting plate and the push rods fixed on the lifting plate rise to a high position, and when the lifting cylinders extend, the lifting plate and the push rods fixed on the lifting plate are lowered to a low position, when the push rods are at the low position, the pushing device can push the molten liquid container to move, and when the push rod is at the high position, the pushing device can move automatically, the molten liquid container can move on the transfer equipment, and the molten liquid container does not interfere with the pushing device.

7. The transfer equipment according to claim 6, wherein when the push rods are at the high position, the bottom surfaces of the push rods are at least 30 mm higher than the top surface of the molten liquid container, and when the push rods are at a low position, the bottom surfaces of the push rods are at least 100 mm lower than the top surface of the molten liquid container.

8. The transfer equipment according to claim 1, wherein the rail platform is of equal height with the rail-type transfer trolley on the casting line, so that the rail platform interface with the rail-type trolleye when transfer operations are performed.

9. The transfer equipment according to claim 1, wherein the rail platform and the rotating device are fixed on the ground, the turnplate of the rotating device can rotate by 180 degrees to achieve a 180 degrees orientation change of the molten liquid container, and the rail on the turnplate and the transfer rail on the rail platform are aligned with each other and butted against each other when the turnplate is at the 0 degree orientation and 180 degrees orientation.

10. The transfer equipment according to claim 1, characterized in that the rotating device comprises a rotating disc forming the turnplate, a rotatory motor reducer, a motor bracket, a rotary bearing and a mounting base, wherein a molten liquid container running rail is provided or machined on the rotating disc, the rotating disc is welded on the disc bracket, the bottom of the disc bracket is mounted on the rotary bearing, the rotary bearing is mounted on the mounting base, and the mounting base is fixed on the ground; the bottom surface of the rotating disc is welded with a ring gear, the rotary motor reducer is mounted on the motor bracket, the motor bracket is fixed on the mounting base, a drive gear is mounted on the drive shaft of the rotary motor reducer, the drive gear is meshed with the ring gear, and when the rotary motor reducer rotates, the rotating disc is driven to rotate.

11. The transfer equipment according to claim 10, wherein four bearing supports are evenly fixed on the mounting base, four universal ball bearings are mounted on the bearing supports, and the universal ball bearings are supported on the bottom surface of the rotating disc and are in contact with the bottom surface of the rotating disc.

12. An aluminum liquid transfer system for transferring aluminum liquid between adjacently arranged casting lines and on each casting line, the casting lines respectively include at least one die-casting machine, the aluminum liquid transfer system comprises a melting furnace used for producing aluminum liquid, a crucible furnace used for holding aluminum liquid and supplying aluminum liquid to a die-casting machine, and a rail-type transfer trolley used for transporting the crucible furnace along the rails on the casting lines, the aluminum liquid transfer system further includes transfer equipment according to claim 1, the rail platform of the transfer equipment extends between the adjacently arranged casting lines, wherein aluminum liquid is used as casting molten liquid, the crucible furnace constitutes the molten liquid container, and the crucible furnace supplies aluminum liquid to corresponding die-casting machine with matched orientation.

* * * * *